United States Patent
Bi et al.

(10) Patent No.: US 7,995,893 B2
(45) Date of Patent: Aug. 9, 2011

(54) MAGNETIC MATERIAL FOR MAGNETO-OPTICAL ISOLATOR

(75) Inventors: Lei Bi, Cambridge, MA (US); Gerald F. Dionne, Winchester, MA (US); Hyun Suk Kim, Cambridge, MA (US); Caroline A. Ross, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 37 days.

(21) Appl. No.: 12/262,739

(22) Filed: Oct. 31, 2008

(65) Prior Publication Data
US 2009/0136191 A1    May 28, 2009

Related U.S. Application Data

(60) Provisional application No. 60/984,453, filed on Nov. 1, 2007.

(51) Int. Cl.
G02B 6/12     (2006.01)
G02B 6/10     (2006.01)
G02B 6/00     (2006.01)
H01L 21/00    (2006.01)

(52) U.S. Cl. ........... 385/131; 385/6; 385/11; 385/14; 385/132; 385/142; 65/386; 257/E27.006; 257/E27.122

(58) Field of Classification Search ............ 385/1–3, 385/6–7, 11, 14, 129–132, 141–143; 359/484.01, 359/484.03; 65/385–386; 438/31, 41; 427/162; 257/E27.006, E27.122
See application file for complete search history.

(56) References Cited

U.S. PATENT DOCUMENTS 5,408,565 A * 4/1995 Levy et al. ............ 385/130
7,006,289 B2 * 2/2006 Ross et al. ............ 359/500

FOREIGN PATENT DOCUMENTS

WO    0181989       11/2001
WO    2004023194    3/2004

OTHER PUBLICATIONS

Dionne et al., "Mixed-Cation Designs of Magnetic Perovskites for Faraday Rotation at IR Wavelengths" Journal of Applied Physics, 101, 2007, pp. 09C524-1-09C524-3.
Yuan-Qiang et al., "Room Temperature Ferromagnetism of Co-Doped CeO2 Thin Films on Si(111) substrates" 2007 Chinese Physical Letters, vol. 24 No. 1 pp. 218-221.
Tiwan et al., "Ferromagnetism in Co doped CeO2: Observation of a giant magnetic moment with a high Curie Temperature" Applied Physics Letters 88, 2006 American Institute of Physics, pp. 142511-1-14251-3.
Bolduc et al., "Magnetism and Magnetooptical Effects in Ce-Fe Oxides" IEEE Transactions on Magnetics, vol. 42, No. 10, Oct. 2006, pp. 3093-3095.

* cited by examiner

Primary Examiner — Brian M. Healy
Assistant Examiner — Michael P Mooney
(74) Attorney, Agent, or Firm — Gauthier & Connors LLP

(57) ABSTRACT

A magneto-optical structure is provided. The magneto-optical structure includes a substrate. A waveguide layer is formed on the substrate for guiding electromagnetic radiation received by the magneto-optical structure. The waveguide layer includes magnetic oxide material that comprises $ABO_3$ perovskite doped with transition metal ions on the B site, or transition metal ions doped $SnO_2$, or transition metal ions doped $CeO_2$.

18 Claims, 12 Drawing Sheets

MAGNETIC MATERIAL FOR MAGNETO-OPTICAL ISOLATOR

PRIORITY INFORMATION

This application claims priority from provisional application Ser. No. 60/984,453 filed Nov. 1, 2007, which is incorporated herein by reference in its entirety.

This invention was made with government support awarded by the National Science Foundation Grant No. DMR-0604430. The government has certain rights in the invention.

BACKGROUND OF THE INVENTION

The invention is related to the field of optics, and in particular to forming optical structures, such as isolators, using magnetic materials.

An isolator is a device that allows polarized light to pass through in one direction, but not in the opposite direction (like a one-way valve). These are useful in photonic applications. An isolator is placed at the outlet of a laser, allowing the light to leave the laser, but not to reenter it, which would make the laser unstable. An isolator typically consists of a pair of polarizers, with their principal axes oriented at 45°, placed around a magneto-optical crystal. The crystal rotates the plane of polarization of light passing through it: this property is called Faraday rotation. The crystal is thick enough that it rotates the plane of polarization of the light by exactly 45°, and the light can therefore pass through the second polarizer. However, if light is propagating towards the laser, it is blocked by the first polarizer and cannot pass.

For optical communications, which operate at a laser wavelength of 1550 nm, isolators are made from a bismuth-substituted yttrium iron garnet material (Bi—YIG) which has a high Faraday rotation of up to about 6° per micron, depending on the Bi content. This means that the isolator crystal needs to be 45°/6=7.5 microns long, or longer for a material with lower Faraday rotation. Isolators are made as discrete devices by growing crystals of Bi—YIG, for example by liquid-phase epitaxy on other garnet substrates, then cutting them into the correct shape and mounting them between polarizers.

Recently, however, there has been interest in making integrated photonic devices in which the isolator is formed as a component on a chip, integrated with the other components (lasers, waveguides, etc.) For an integrated optical device, it is important to note that there are various designs of isolators other than that shown in the figure above, for instance devices based on Mach-Zehnder interferometers. These other designs have the advantage that they do not require separate polarizers and analyzers, making them more suitable for integration. Additionally, they can work successfully using magneto-optical materials with relatively modest values of Faraday rotation, e.g. less than 0.1°/micron.

For making an integrated isolator, the following properties are the most important: (1) the material must have a Faraday rotation, but it can be modest, in the range of ~0.01°/micron or greater; (2) the material must have a high degree of transparency at the relevant wavelength (1550 nm), and (3) the material must be compatible with a substrate such as GaAs or Si, meaning that it can be grown as a good quality crystal and subsequently processed on a GaAs or Si substrate.

Bi—YIG satisfies the first two criteria but not the third. It is hard to grow as a single crystal film on a substrate other than garnet, so if it is grown on Si or GaAs it does not have the required magneto-optical properties. There is therefore interest in finding alternative materials with high Faraday rotation that can be integrated on Si or GaAs substrates.

SUMMARY OF THE INVENTION

According to one aspect of the invention, there is provided a magneto-optical structure. The magneto-optical structure includes a substrate. A waveguide layer is formed on the substrate for guiding electromagnetic radiation received by the magneto-optical structure. The waveguide layer includes magnetic oxide material that comprises a perovskite-structured material, of formula $ABO_3$ (with A and B representing metal ions and O representing oxygen ions) doped with transition metal ions on the B site, or transition metal ion-doped $SnO_2$, or transition metal ion-doped $CeO_2$.

According to another aspect of the invention, there is provided a method of forming a magneto-optical structure. The method includes providing a substrate. Also, the method includes forming a waveguide layer on the substrate for guiding electromagnetic radiation received by the magneto-optical structure. The waveguide layer includes magnetic oxide material that comprises $ABO_3$ perovskite doped with transition metal ions on the B site, or transition metal ion-doped $SnO_2$, or transition metal ion-doped $CeO_2$.

DETAILED DESCRIPTION OF THE INVENTION

The invention involves a new class of materials used to form magnetic isolators. From the development of earlier garnet rotators at infrared (IR) wavelengths, much insight was gained into the fundamental physics of magnetically aligned electric-dipole transitions. Some of the main requirements for a Faraday rotator are summarized as follows: (1) To align the orbital angular momentum vectors of the individual ion electric dipoles (through spin-orbit coupling), the material must be spontaneously magnetic (ferro- or ferrimagnetic) with reasonably low anisotropy field while maintaining a Curie temperature Tc>300 K. (2) Electric-dipole transitions of the magnetic ion must satisfy orbital and spin selection rules $\Delta L_z=0$, $\pm 1$ (Laporte's rule) and $\Delta S_z=0$, respectively. (3) Wavelengths of interest must fall in the wings of the Lorentzian-shaped line to avoid the high absorption loss near its center frequency. Because optical spectra are not tunable as in the case of some magnetic dipole transitions, i.e., by a Zeeman effect, this narrows further the choice of possible candidates.

To satisfy the above conditions in a magnetic insulator, two approaches with room-temperature net magnetization are considered. Both are "double" perovskites of generic formula {AA'} [BB']$O_6$ with charge-ordered magnetic cations B and B' of different ionization states and magnetic moments. For this application, the type of magneto-optical system is termed "diamagnetic" for an S→P transition, with an orbital singlet S ground state and a threefold degenerate P state as the excited level, which is subsequently split by energy 2A in the spin-orbit multiplet structure. This orbital state arrangement is contrasted with the P→S "paramagnetic" case in the schematic diagrams of FIG. 1.

Figure 1A:
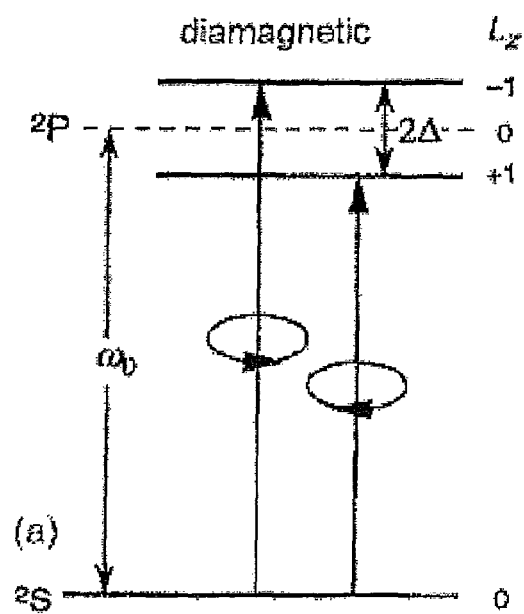
FIGS. 1A-1B are schematic diagrams illustrating the electric-dipole transition $\Delta L_z=\pm1$ models for Faraday rotation.
Figure 1B:
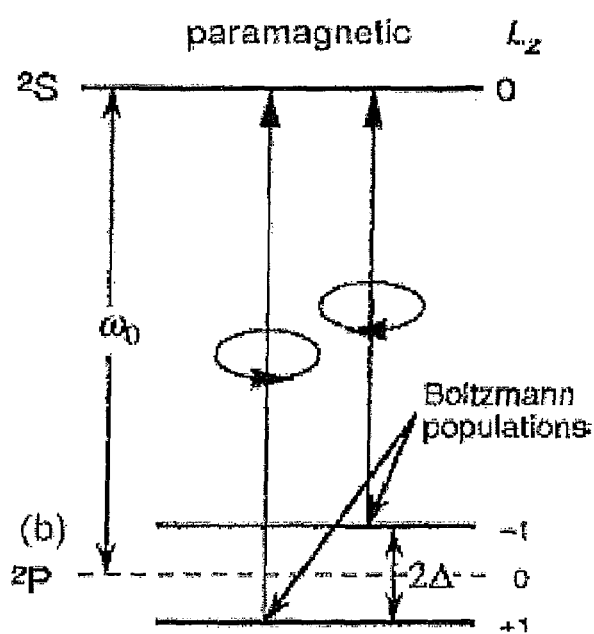

FIGS. 1A-1B show the basic electric-dipole transition $\Delta L_z=\pm 1$ models for Faraday rotation. FIG. 1A illustrates the S→P "diamagnetic" case with two circular polarization modes separated by the spin-orbit multiplet splitting (2A) of the excited P state and FIG. 1B shows the P→S "paramagnetic" case, termed such because the splitting of the ground state is magnetic-field dependent and the Boltzmann populations are temperature dependent.

Figures 2A, 2B, 2C:
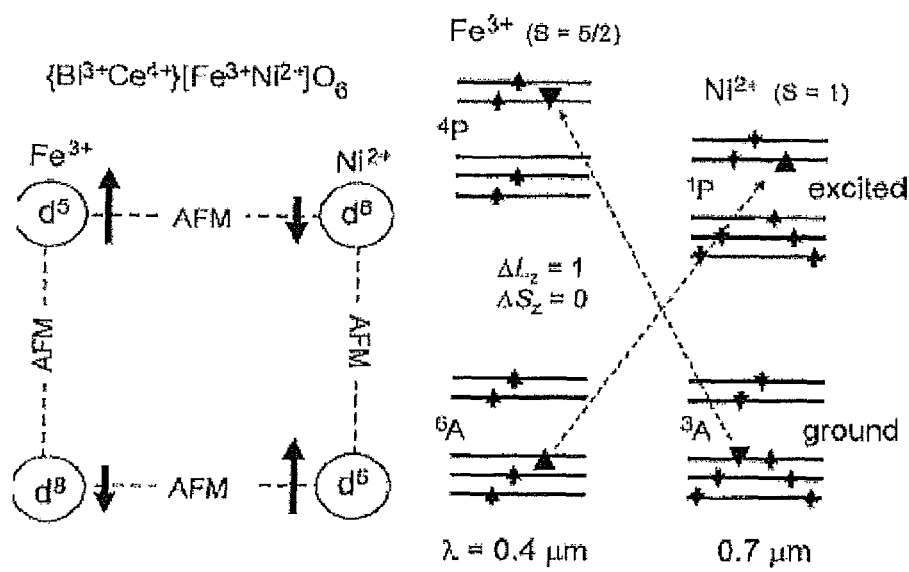
FIGS. 2A-2C are schematic diagrams illustrating an unit-cell face (without oxygen) of charge-ordered $Fe^{3+}$ and $Ni^{2+}$ ferrimagnetically coupled at corners, and cross transfers needed to preserve $\Delta S_z=0$.

Orthoferrites can have a weak net magnetic moment from antiferromagnetic (AFM) $Fe^{3+}$ spins because of the 0.5° canting angle. If, however, the ions are charge ordered with opposing spins of different magnitudes, the AFM sublattices produce a net moment that is "quasiferrimagnetic." The compound proposed is {$Bi^{3+}+A'^{4+}$} [$Fe^{3+}Ni^{2+}$]$O_6$ as described in FIGS. 2A-2C. Following the conclusions derived from the spectral analysis of Bi-substituted magnetic garnets, $Fe^{3+}$ and $Ni^{2+}$ or $Co^{2+}$ are chosen for the octahedral B sites based on (1) their antiparallel spin ordering controlled by $Fe^{3+}$—$O^{2-}$—$Ni^{2+}$ superexchange and (2) their crystal-field structures illustrated in the accompanying Aufbau d-electron diagrams, FIGS. 2B and 2C. To use $Bi^{3+}$ to enhance the Faraday rotation parameter $\theta_F$ (degrees per unit length) by increasing the p-state splitting shown in FIG. 1A, a 4+ ion, such as $Ce^{4+}$ or $Zr^{4+}$ must share the A sublattice with $Bi^{3+}$.

Figure 3:
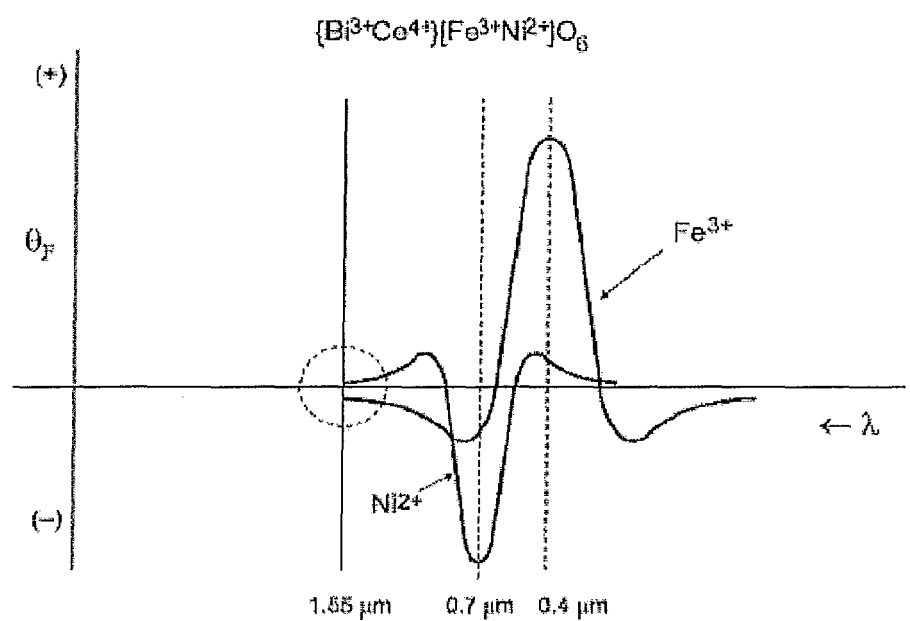
FIG. 3 is a graph illustrating the proposed Bi-enhanced Faraday rotation spectra of $Fe^{3+}$ and $Ni^{2+}$ quasiferrimagnetic sublattices from cross-transfer transitions.

The $Fe^{3+}$ and $Ni^{2+}$ ions will produce independent Faraday rotation spectral lines that are of opposite signs, of different wavelengths, and of different intensities. To satisfy the $\Delta S_z=0$ selection rule, the transitions would have to be simultaneous cross transfers, as was confirmed for the $Fe^{3+}$ transitions between octahedral and tetrahedral sites in magnetic garnets. Based on the Tanabi-Sugano calculations, the anomalously strong $Bi^{3+}$-enhanced $Fe^{3+}$ ($d^5$) line is expected to be centered at wavelength $\lambda=0.4$ μm and the $Ni^{2+}$ ($d^8$) would appear at $\lambda=0.7$ μm. At $\lambda=1.55$ μm, the algebraic sum of the long wavelength tails will determine the magnitude of the net $\theta_F$, as sketched in the spectrum model of FIG. 3. If the $\theta_F$ contribution of $Ni^{2+}$ is also enhanced by the excited-state molecular-orbital (covalent) couplings to $Bi^{3+}$, the difference between the two contributions will still be amplified accordingly to produce a high figure of merit. Absorption curves are not included in these sketches. For Lorentzian line shapes, the ratio of $\theta_F$ to decibels of loss will increase into the tails of the line as the frequency moves away from resonance.

Figures 4A, 4B, 4C:
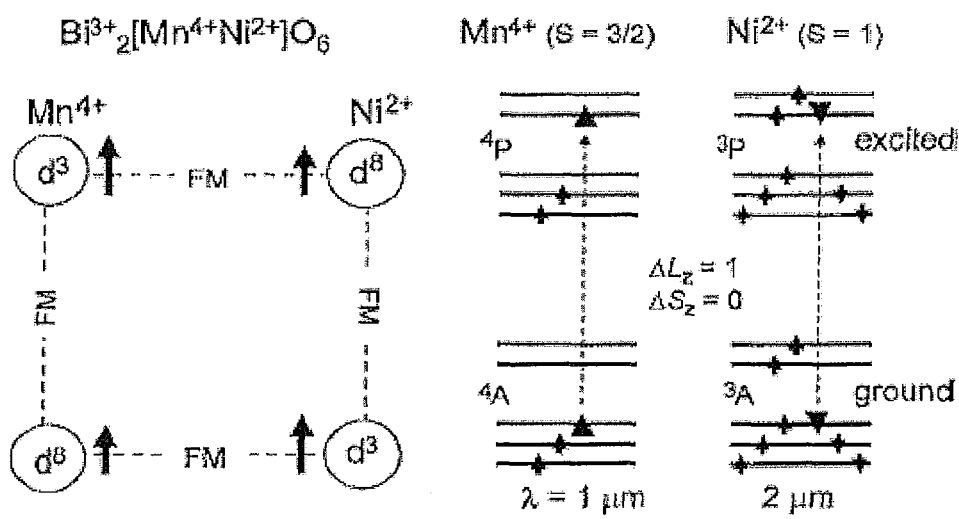
FIGS. 4A-4C are schematic diagrams illustrating an unit-cell face (without oxygen) of charge-ordered $Mn^{4+}$ and $Ni^{2+}$ ferromagnetically coupled at corners and direct transfers that satisfy selection rules within each ion's electronic structure.

The second design concept involves making use of the room-temperature ferromagnetism that has been demonstrated in a perovskite compound of composition $La_2^{3+}[Mn^{4+}Ni^{2+}]O_6$ as both bulk ceramic and films prepared by pulsed-laser deposition. Because $Mn^{4+}$ ($d^3$) and $Ni^{2+}$ ($d^8$) in a 180° cation-anion-cation bond configuration have all five 3d orbital states as either half filled/filled or half filled/empty, this system obeys the Goodenough-Kanamori rules for ferromagnetic spin ordering by delocalization superexchange, as illustrated in FIG. 4. FIG. 4A show a unit-cell face (without oxygen) of charge-ordered $Mn^4$ and $Ni^2$ ferromagnetically coupled at corners. FIGS. 4B-4C show direct transfers satisfy selection rules within each ion's electronic structure.

With spins of $Mn^{4+}$ (S=3/2) and $Ni^{2+}$ (S=1) aligned parallel, spin flips are not required to satisfy the $\Delta S_z=0$ selection rule in either case, and cross transfers are not involved. Both ions have similar energy-level structures but with S→P transitions at X=1.0 and 2.0 μm, respectively, thereby bracketing the 1.55 μm wavelength of interest.

Figure 5:
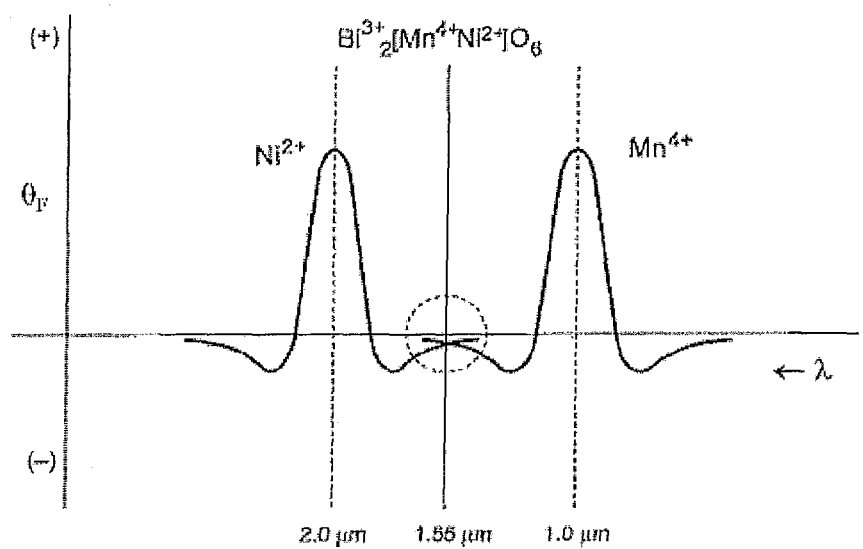
FIG. 5 is a graph illustrating the proposed Faraday rotation spectra of $Mn^{4+}$ and $Ni^{2+}$ ferromagnetic sublattices at crystal-field wavelengths.

The $\theta_F$ models in FIG. 5 indicate the overlap of two Lorentzian line tails that reinforce inside the transmission window (absorption tails not included). For both $Mn^{4+}$ and $Ni^{2+}$ the splitting of the excited P states by spin-orbit coupling would be enhanced if $Bi^{3+}$ replaced $La^{3+}$ to form $Bi_2^{3+}[Mn^{4+} Ni^{2+}]O_6$. However, the covalent interaction between $Bi^{3+}$ and the B-site cations would tend to increase the orbital overlap integrals in the ground states and increase the Curie temperatures, as was reported for the magnetic garnets.

The materials proposed here are perovskite structures that rely on the ordering of cations such as $Ni^{2+}$ and $Fe+^3$ on the B sites. Ordered perovskites of this type have been synthesized previously. For example, $La_2[MnNi]O_6$ has been grown in a distorted perovskite structure using solid-state synthesis, and the ordering of the $Mn^{4+}$ and $Ni^{2+}$ ions on the B sites is confirmed by neutron diffraction. The material forms on MgO and $SrTiO_3$ substrates by pulsed-laser deposition and found to have properties approaching those of the bulk ceramic. It is also possible to make ordered materials by sequential deposition of individual layers of oxide. As an example, films of ferromagnetic $La_2[CrFe]O_6$ have been obtained by molecular-beam epitaxial growth as a superlattice consisting of alternating layers of $LaFeO_3$ and $LaCrO_3$ along the [111] direction, even though the $La_2CrFeO_6$ compound is thermodynamically unstable. The cation-ordered superlattice structure had a Curie temperature of 375 K and markedly different magnetic properties from that of the $La_2CrFeO_6$ cation-disordered solid solution. Synthesis of the ordered double perovskites proposed in the present invention may be approached using similar methods.

The invention describes two chemical designs and corresponding electric-dipole transitions in films intended for Faraday rotation devices at IR wavelengths. Both schemes present significant challenges in material preparation, particularly where charge ordering is required to sustain the magnetized state above room temperature. Because of the complexity of the compositions, even before considering the effects of lattice and thermal expansion mismatches to the substrate, considerable patience might have to be exercised before arriving at a suitable set of growth parameters. Although very thin films of the ferromagnetic compound have been deposited successfully, thickness control remains an issue if the films are to be integrated with fiber-optical transmission systems. Measurements of magneto-optical figures of merit have not been found for either bulk or film specimens.

In view of the chemical designs, the invention provides three kinds of magnetic oxide materials as candidates for use in developing Faraday rotators. (1) Transition metal ion (Cr, Mn, Fe, Co, Ni) doped $CeO_2$ (2) Transition metal ion (Cr, Mn, Fe, Co, Ni) doped $SnO_2$ (3) Transition metal ion (Cr, Mn, Fe, Co, Ni), plus Bi ion or Ce ion, co-doped $SrTiO_3$ or other perovskite. These materials are magneto-optically active due to doping with transition metal ions. In addition, the presence of Pb, Ce or Bi in the perovskite is expected to increase the magneto-optical activity without increasing the absorption. By using a buffer layer, these materials can be grown epitaxially on Si, which makes them suitable for integration. Three examples of these materials are described. Other materials of this type doped with different transition metal ions may be also included.

On the materials of interest in forming a Faraday rotator are $Ce_{1-x}Co_xO_{2-\delta}$ (x=0, 0.02, 0.06, 0.15 and 0.25, namely samples Co0, Co2, Co6, Co15 and Co25 respectively) were fabricated by pulsed laser deposition (PLD) on MgO (100) substrates with a Coherent COMPexPro 205 KrF (248 nm) excimer laser. The $Ce_{1-y}Co_yO_{2-\delta}$ (y=0, 0.05, 0.10, 0.20, 0.30) targets are prepared by a conventional solid-state reaction technique. Due to the high diffusivity of Co atoms during high temperature sintering, a lower Co concentration was obtained in the films compared with the nominal target compositions.

The depositions are carried out in vacuum ($1.0 \times 10^{-6}$ Torr) with a substrate temperature of 700° C. The film thicknesses for samples Co0, Co2, Co6, Co15, Co25 were 720 nm, 753 nm, 262 nm, 391 nm and 953 nm respectively as determined by profilometer. The stoichiometries of these films were characterized by wavelength dispersive spectroscopy (WDS), and Bragg 1D and 2D X-ray diffraction (XRD) was carried out to determine the structural properties. The magnetic properties were measured on an ADE vibrating sample magnetometer (VSM). Magneto-optical characterization, i.e. the measurement of Faraday rotation as a function of applied field, was performed at 1550 nm wavelength on a custom-built apparatus described in ref. 10. The optical transmission characterization was performed on a Cary 5E UV-visible-infrared spectrophotometer. For comparison, several films were also made on $SrTiO_3$ (100) substrates.

Figure 6:
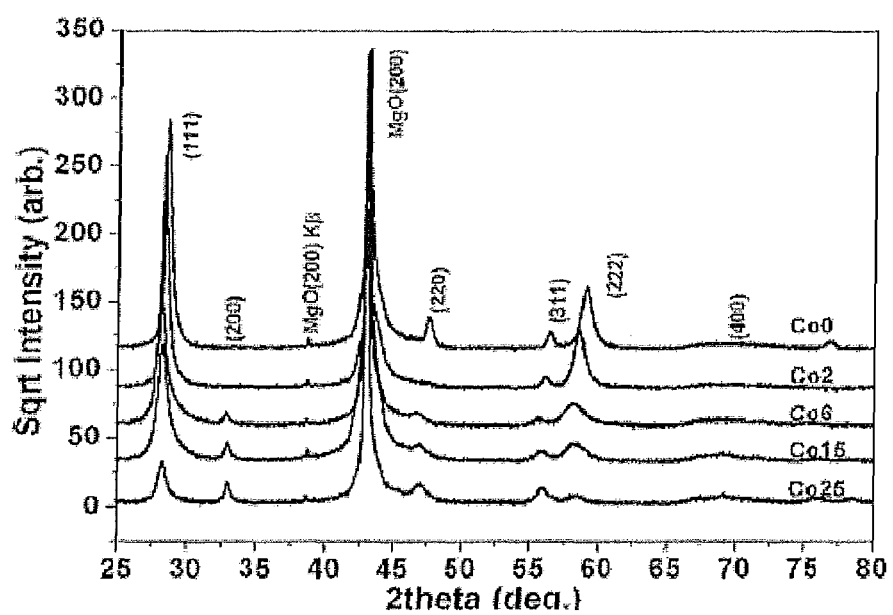
FIG. 6 is a x-ray diffraction spectra of $Ce_{1-x}Co_xO_{2-\delta}$ films, with x=0, 0.02, 0.06, 0.20, and 0.30.

$CeO_2$ crystallizes in the fluorite structure with a lattice parameter of 5.41 1 Å. FIG. 6 shows the XRD spectrum of the films on MgO vs. Co concentration. A square root intensity scale is used to clearly present all the diffraction peaks. All the films show peaks corresponding to the $CeO_2$ phase only. No diffraction peaks of secondary phases are found regardless of the Co concentration, which suggests that Co forms a solid solution with $CeO_2$ in all our samples. These films are textured when grown on MgO (100) substrates, and have a (111) preferred orientation. Atomic force microscopy of the Co6 sample suggests a grain size of about 40 to 100 nm. With increasing Co concentration, the intensity of the $CeO_2$ (111) and (222) peaks decreases and diffraction peaks from other crystal planes of ceria become more prominent, indicating that the grains become more randomly oriented.

The incorporation of Co results in significant shifts of the diffraction peak position. With increasing Co concentration, the out-of-plane lattice constant first increases from 5.4 12 Å in Co0 to 5.489 Å in Co6, then decreases to 5.478 Å in Co25. Changes in lattice parameter may result from a change in the stress state of the film or from the difference in size of the Co and Ce ions in the solid solution. Stress analysis by XRD using the $\sin^2\phi$ method indicates that all the films are highly compressively strained. Considering that the Young's modulus and Poisson's ratio for ceria are 181 GPa and 0.311 respectively, a stress level of −1 GPa to −4 GPa is calculated in these films. This high compressive stress is attributed to plume-induced energetic particle bombardment. For the highly doped samples, Co15 and Co25, the unstrained lattice constant is smaller than for undoped $CeO_2$, even though the stress levels are greater; this lattice shrinkage suggests that the Co is present in substitutional sites and not in the interstitial sites, where it would cause a lattice expansion. Notably, in $CeO_2$ the interstitial and substitutional sites have identical 8-fold cubic coordination by oxygen. However, due to the film texture and the weak intensity of the ceria peaks, it is difficult to determine precisely the unstrained lattice parameter in the low-doped samples Co2 and Co6, and therefore to determine the change in lattice parameter upon doping at low doping levels.

Figure 7:
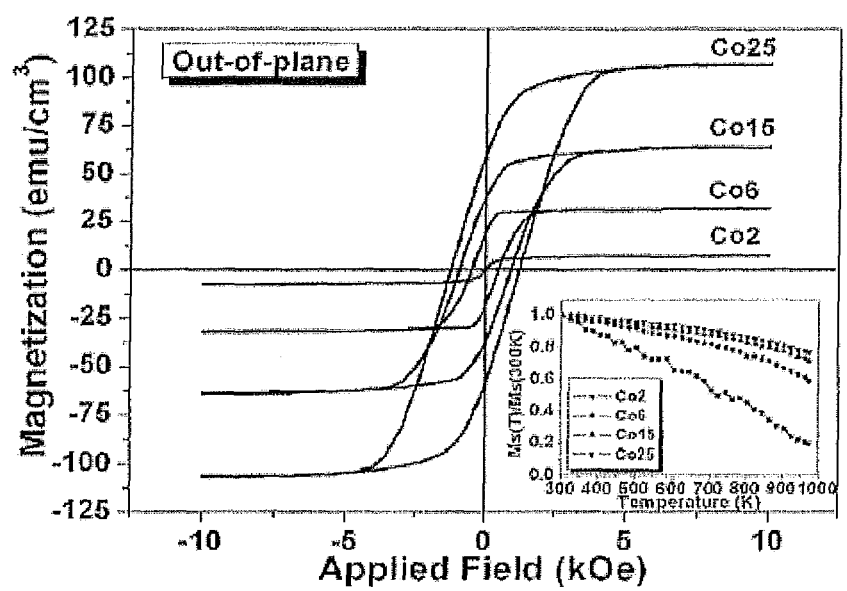
FIG. 7 is a graph illustrating out-of-plane magnetization as a function of applied field for $Ce_{1-x}Co_xO_{2-\delta}$ films with x=0.02, 0.06, 0.20, and 0.30.

The room temperature out-of-plane magnetization data of the films are given in FIG. 7. All the samples show hysteresis loops except Co0. The doped films have high magnetic anisotropy with an out-of-plane easy axis. When magnetized in-plane, the magnetization cannot be saturated even at 10 kOe. As the Co concentration increases, the saturation magnetization ($M_s$) increases from 7.2 emu/cm$^3$ to 106.6 emu/cm$^3$, the remanent magnetization ($M_r$) increases from 0 to 59.6 emu/cm$^3$, and the coercivity ($H_c$) increases from 0 to 1200 Oe. Co2 shows an anisotropic hysteresis loop, but with almost zero remanence and coercivity. The inset of FIG. 7 gives the $M_s$ versus temperature curve for Co2, Co6, Co15 and Co25. The Curie temperatures of these films are all higher than 1000 K. Repeated cycling up to 1000 K did not affect the shape of the $M_s(T)$ curve. This indicates the stability of the film structure, and the absence of secondary phase formation, during high temperature processing.

Figure 8:
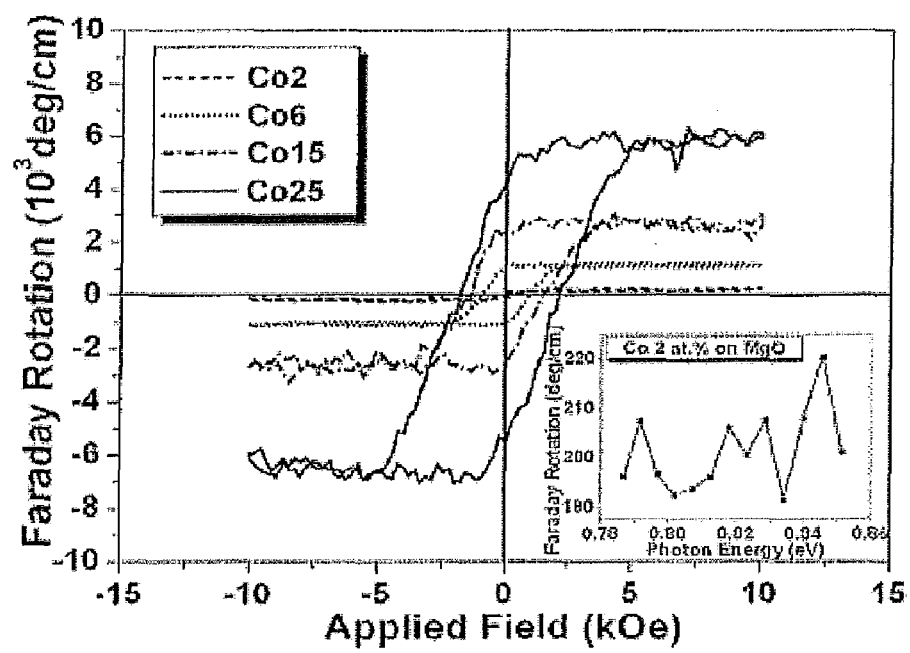
FIG. 8 is a graph illustrating Faraday rotation of $Ce_{1-x}Co_xO_{2-\delta}$ films (x=0.02, 0.06, 0.20, 0.30) at 1550 nm wavelength, as a function of applied field.

FIG. 8 shows the Faraday rotation results at 1550 nm wavelength, measured with the magnetic field perpendicular to the film plane. Sample Co0 does not have an observable Faraday rotation, while samples Co2, Co6, Co15, Co25 show saturation Faraday rotations of 210, 1200, 2600 and 6900 deg/cm respectively. The signal is noisier for samples with higher Co concentration, due to the higher optical absorption in these films. The Faraday rotation hysteresis loop resembles the shape of the out-of-plane magnetization data obtained by VSM. As the Co concentration increases, the coercivity increases from 200 Oe to 2000 Oe, which is higher than the values observed in the VSM hysteresis loops. The inset of FIG. 8 shows the Faraday rotation of Co2 as a function of incident photon energy over a 1 eV range. There is no systematic variation in the Faraday rotation in this wavelength range, and similar behavior was found for samples Co6, Co15 and Co25. This behavior differs from Co-doped yttrium iron garnet (YIG), which shows a significant wavelength dependence. If the Faraday rotation originates from the Co ions, this result suggests that the Co ions in $CeO_2$ are located in a different crystal field from that of the Co ions in YIG.

Figure 9:
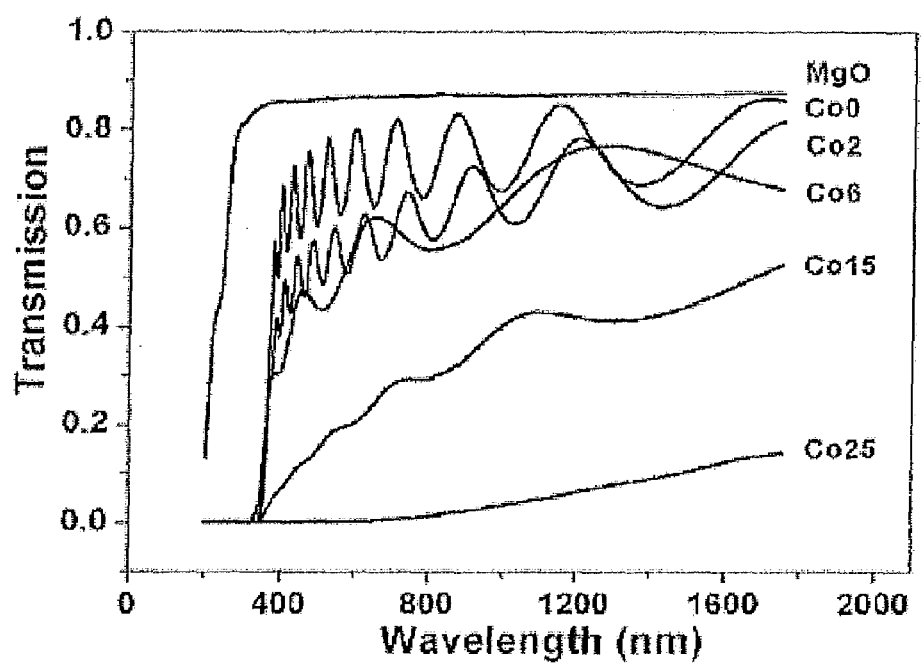
FIG. 9 is a graph illustrating optical transmission spectra of an MgO substrate and $Ce_{1-x}Co_xO_{2-\delta}$ films on MgO, where x=0, 0.02, 0.06, 0.20, and 0.30.

The optical transmission spectra of the MgO substrate and the samples are shown in FIG. 9. Considering that the thickness of these films varies, it is difficult to compare the transparency of these samples directly by comparing their transmission curves. However, by observing the decrease of the transmission intensity and the reduction of the interference fringes, it is apparent that the material becomes increasingly opaque as the Co doping level rises. Due to the high transparency of MgO substrate at infrared wavelength, we used a technique based on the interference fringes to calculate the refractive index (n) and extinction coefficient (k) of samples Co0 and Co2 at 1550 nm wavelength.

For Co0, n=2.305±0.016 and k=0.0029±0.0008. For Co2, n=2.352±0.03 8 and k=0.0096±0.0018. The error is determined by assuming a 1% error in determining the percentage of transmitted light, which represents an upper limit for the error in this wavelength range. The calculated refractive index for pure CeO2 agrees very well. Calculations on samples Co6, Co15 and Co25 were not carried out because very few interference fringes appear in the transmission spectra, rendering the calculation inaccurate. Nevertheless, it appears that Co doping increases both the refractive index and the extinction coefficient of the CeO2 film.

The magneto-optical figure of merit, which is the ratio of the Faraday rotation to optical loss, is calculated for sample Co2 to be 0.25 deg/dB at 1550 nm. This value is more than 10 times lower than that of YIG at this wavelength, and similar or lower figures of merit were estimated for higher Co contents. The large absorption in these films may be the result of cation valence changes caused by oxygen vacancies, which are beneficial to the RT ferromagnetism, but are detrimental to the optical transmission.

For comparison, Co2 and Co6 samples were also fabricated on $SrTiO_3$ (100) substrates. These films show the (200) epitaxial $CeO_2$ peak, which is consistent with the other known data. However, two other diffraction peaks show up near $2\theta=40°$. These peaks do not correspond to cobalt metal, cobalt oxide or cerium oxide diffraction peaks. Two-dimensional X-ray diffraction shows that these peaks originate from a highly epitaxial phase within the film. As EDS analysis shows that the samples only contain Ce, Co and O elements, these peaks may be caused by ordered oxygen vacancies in the epitaxial $CeO_2$ lattice. Despite the structural differences, the magnetic and magneto-optical properties of these films are very similar to those grown on MgO (100).

Several features of the magnetic data are sufficiently remarkable to encourage further investigation. The host lattice $Ce^{4+} O_2$ is a reduced rare-earth oxide film deposited in vacuum with the capability of cation mixed valence through the charge transfer reaction $Ce^{3+} \leftrightarrows Ce^{4+}+e^-$, thereby offering electron carriers that could be transported by coherent polaron tunneling or random thermal hopping to produce ferromagnetic (FM) double exchange. Furthermore, the Co additions can also occur in multiple valence states 2+, 3+, or 4+, each of which has transportable unpaired spins. Because the cation sites are cubic with 8-fold $O^{2-}$ coordination, at higher concentrations there is the increased likelihood that $Co^{3+}$—$Ce^{3+}$ direct 3d-4f FM exchange of the type seen in magnetic garnets can offset any spin alignment frustration from $Co^{3+}$—$O^{2-}$—$Co^{3+}$ AFM superexchange.

At room temperature there is the usual anisotropic paramagnetism with 2% Co concentration. Unlike the typical dilute magnetic semiconductor, however, Curie temperatures increase to values that exceed 1000 K as Co concentrations reach 25%, and hysteresis loops grow with Co concentration. Both magnetization M (saturation and remanent) and coercive field increase systematically with Co content at 300 K, despite the expectation of increasing $Co^{3+}$—$O^{2-}$—$Co^{3+}$ spin frustration mentioned above. Since both Co and Ce ions can be optically active in the wavelength band of interest, there is uncertainty about the ionic source of the Faraday rotation (FR) and also the cause of the significantly greater coercive fields in the FR hysteresis loops in FIG. 8 compared with those of the corresponding M loops presented in FIG. 7. Since FR requires orbital magnetic moment alignment in both the ground and excited states of the electric dipole transitions, the switching energy could possibly differ from that of the ground state alone, depending on the disposition of orbital angular momentum between these two states.

Other material structures like $Sn_{1-x}Fe_xO_2$ (x=0.05, 0.10, 0.20, 0.30) can be used. These film structures are deposited using pulsed laser deposition on $Al_2O_3$ substrates. The films show $SnO_2$ single phase according to x-ray diffraction. These films are room temperature ferromagnetic, and show Faraday rotation at 1550 nm wavelength. Moreover, $(Bi_{0.3}Sr_{0.7})(Ti_{0.7}Co_{0.3})O_3$ can also be used. These films are deposited using pulsed laser deposition on $LaAlO_3$ substrates. The films show epitaxial single phase according to x-ray diffraction. Magnetic and magneto-optical properties can be optimized by adjusting the Bi and Co concentration or substituting other ions. Apart from $SrTiO_3$, other perovskites can be co-doped in this way.

Figure 10A:
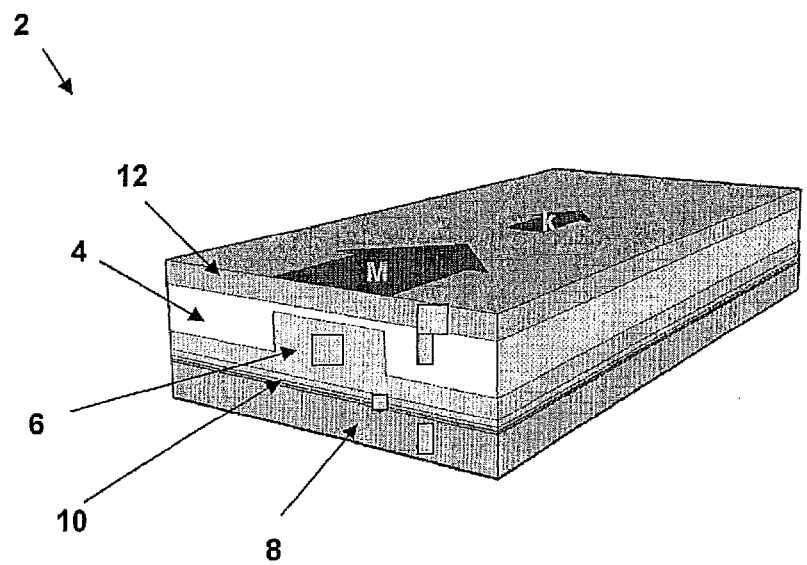
FIGS. 10A-10C are schematics diagrams of a Faraday rotator formed in accordance with the invention.
Figure 10B:
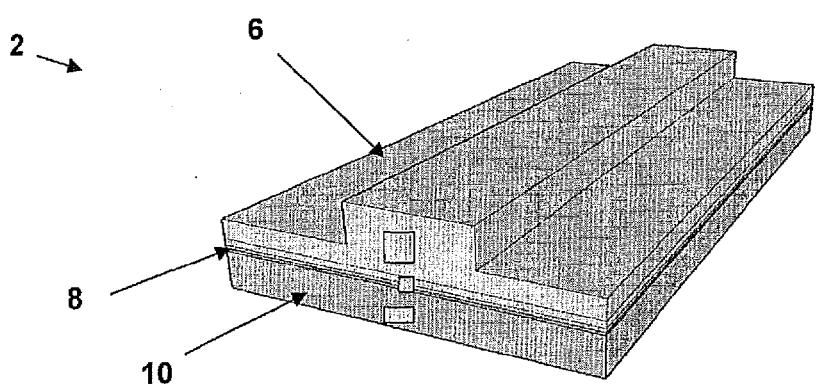

FIGS. 10A-10B show a magneto-optical waveguide 2 using magnetic oxide materials with Faraday configuration for integrated isolator applications. FIG. 10A shows the structure 2 with cladding layer 4. For clearance, FIG. 10B shows the structure 2 with a ridge waveguide layer 6 without a cladding layer 4.

The magneto-optical waveguide 2 includes a substrate 10 that can be either a Si, SOI (silicon on oxide), GaAs or other III-V semiconductor substrate. Buffer layers 8 are formed on the substrate 8 so as to allow epitaxial growth of a ridge waveguide layer 6. The buffer layers 8 can also act as cladding layer 4 if it is grown thick. Typical buffer layers 8 include: single buffer MgO, double buffer $CeO_2$/YSZ(Yttrium stabilized zirconia) or triple buffer $Bi_4Ti_3O_{12}$/$CeO_2$/YSZ etc. The optical cladding layer 4 is provided having materials with lower refractive index as compared to the ridge waveguide layer 6. The cladding layer 4 covers the top region of the ridge waveguide layer 6 having magnetic oxide material, such as $ABO_3$ perovskite doped with transition metal ions on the B site, or transition metal ions doped $SnO_2$, or transition metal ions doped $CeO_2$. This ridge waveguide layer 6 can have several layers to be a strip-loaded structure. A permanent magnet film 12 is positioned on the cladding layer 4, and provides a magnetization along the ridge waveguide direction z. The magnetization direction M is parallel to the light propagation direction k along the z direction.

The incident light is firstly linearly polarized by a polarizer before entering the waveguide structure 2. The linearly polarized light enters the waveguide 2 along the z direction. Due to the magnetic field provided by the permanent magnet film 12 along z direction, Faraday rotation is achieved when light is propagating in the structure 2. A 45° rotation of the polarization direction of the light is achieved when the light exits the waveguide structure 2, and it passes through an analyzer 36 configured with the polarization direction 45° rotated to the initial polarization direction of the light.

Figure 10C:
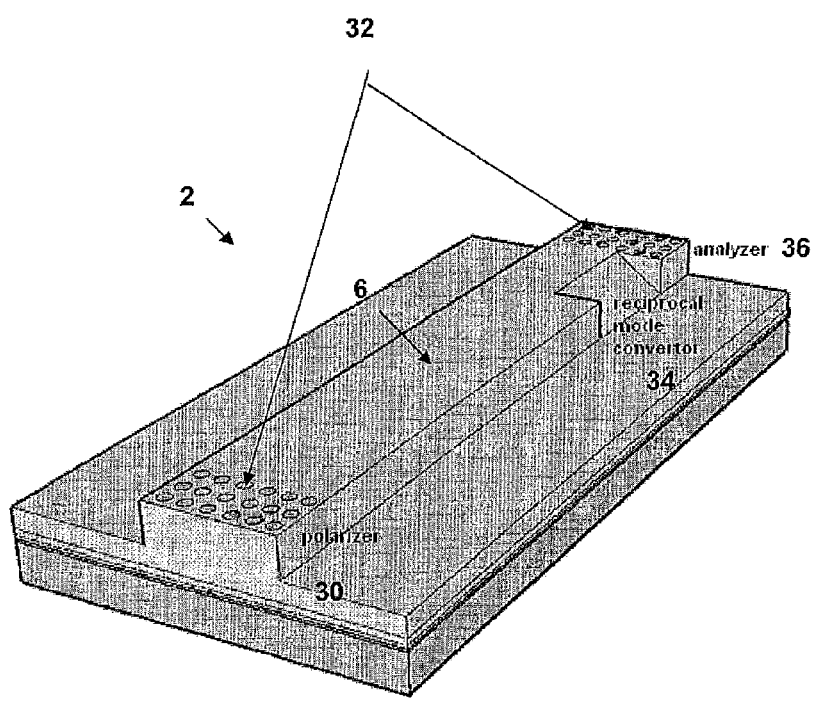

The integrated polarizer is shown in FIG. 10C. To make these polarizers 30 and analyzers 36 firstly a selective number of holes 32 with certain spacing and diameters are fabricated by lithography followed by etching on the waveguide 2. Then Cu is deposited in these holes 32. The copper wires provide TE mode polarization of the incoming light. After light propagating along the waveguide 2 in waveguide layer 6, 45 degree rotation of the polarization direction is achieved. The light then passes through a reciprocal mode converter 34 defined by etching, which rotates the polarization direction for −45 degrees, and the light passes through the analyzer. For light propagating towards the laser side, the reciprocal mode converter 34 rotates the polarization direction for 45 degrees, the waveguide 2 provide another 45 degree Faraday rotation, and the light is blocked by the polarizer 30. When the light is reflected from outside of the waveguide structure 2, the polarization direction is rotated for an additional 45° by the waveguide structure 2 and is blocked by the polarizer 30, and therefore the optical isolation is achieved.

Figure 11A:
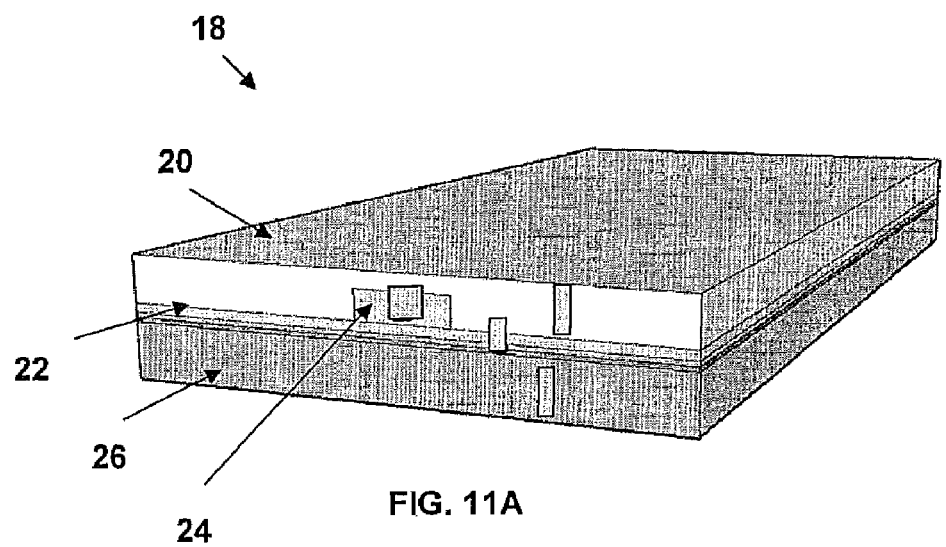
FIGS. 11A-11B schematics diagrams of a Mach-Zehnder interferometer formed in accordance with the invention.
Figure 11B:
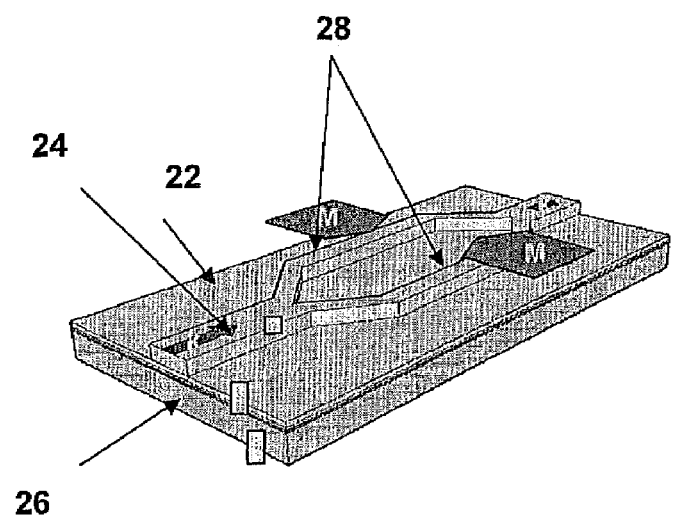

FIGS. 11A-11B show a Mach-Zehnder interferometer 18 using magnetic oxide materials for integrated isolator applications. FIG. 11A shows the Mach-Zehnder interferometer 18 with cladding layer 20. For clarity, FIG. 11B shows the Mach-Zehnder interferometer 18 without the cladding layer 20. A multitude of buffer layers 22 can be used to allow epitaxial growth of waveguide layer 24. The buffer layers 22 can also act as cladding layers 20 if it is grown thick. Typical buffer layers 22 include: single buffer MgO, double buffer $CeO_2/YSZ$(Yttrium stabilized zirconia) or triple buffer $Bi_4Ti_3O_{12}/CeO_2/YSZ$ or the like.

The Mach-Zehnder interferometer 18 includes a substrate 26 that can be Si, SOI (silicon on oxide), GaAs or other III-V semiconductor substrates. If using a SOI substrate, the buried oxide can act as a cladding layer 22. The waveguide layer 24 can include a channel or ridge waveguide having magnetic oxide material having two arms 28, such as $ABO_3$ perovskite doped with transition metal ions on the B site, or transition metal ions doped $SnO_2$, or transition metal ions doped $CeO_2$. This waveguide layer 24 can have several layers to be a strip-loaded structure and has two arms 28. Then optical cladding layer 22 having materials with lower refractive index as compared to the waveguide layer 24, and being formed on the top surface of the waveguide layer 24.

The incident light with TM mode enters the waveguide 24 along z direction and is split in equal intensity into the two arms 28 of the Mach-Zehnder interferometer 18. The magnetic fields M provided by micro-electromagnetic coils or permanent magnets (not shown in figure) are antiparallel to each other at the two arms 28 (along x and −x direction), and are both perpendicular to the incident light wave vector k direction (along z). In this configuration 18, non-reciprocal phase shift is achieved. Light in both arms 28 propagating along z direction achieves 0° phase difference between each other, and forms constructive interference when they exit the device, which allows the light to propagate along z direction. However for light reflected back along the −z direction, 180° phase shift is achieved between each other when they exit the device, and destructive interference is achieved, which prevents the reflected light to propagate along −z direction. Therefore optical isolation is achieved.

Although the present invention has been shown and described with respect to several preferred embodiments thereof, various changes, omissions and additions to the form and detail thereof, may be made therein, without departing from the spirit and scope of the invention.

What is claimed is:

1. A magneto-optical structure comprising:
a substrate; and
a waveguide layer formed on said substrate for guiding electromagnetic radiation received by said magneto-optical structure, said waveguide layer includes magnetic oxide material that comprises a $ABO_3$ perovskite structure doped with a transition metal ion on the B site, or a transition metal ion doped $SnO_2$, or a transition metal ion doped $CeO_2$, said transitional metal ion allows said waveguide layer to be magneto-optically active and with the presence of Pb, Ce, or Bi in said $ABO_3$ perovskite structure increases magneto-optical activity in the waveguide layer without increasing optical absorption at room temperature.

2. The magneto-optical structure of claim 1 further comprising a plurality of buffer layers formed on said substrate so as to allow epitaxial growth of said waveguide layer on said substrate.

3. The magneto-optical structure of claim 1 further comprising a cladding layer covering the top region of the waveguide layer.

4. The magneto-optical structure of claim 3, wherein said optical cladding layer comprises materials with lower refractive index as compared to the waveguide layer.

5. The magneto-optical structure of claim 1 further comprising a permanent magnet film positioned on the layer cladding layer and provides a magnetization along the waveguide layer.

6. The magneto-optical structure of claim 1, wherein said waveguide layer comprises a channel waveguide.

7. The magneto-optical structure of claim 1, wherein said waveguide layer comprises a ridge waveguide.

8. The magneto-optical structure of claim 5, wherein said permanent magnet film provides a magnetic field where Faraday rotation is achieved when light is propagating in said magneto-optical structure.

9. The magneto-optical structure of claim 1, wherein said waveguide layer comprises a Mach-Zehnder interferometer.

10. A method of forming a magneto-optical structure comprising:
providing a substrate;
forming a waveguide layer on said substrate for guiding electromagnetic radiation received by said magneto-optical structure, said waveguide layer includes magnetic oxide material that comprises a $ABO_3$ perovskite structure doped with a transition metal ion on the B site, or a transition metal ion doped $SnO_2$, or a transition metal ion doped $CeO_2$, said transitional metal ion allows said waveguide layer to be magneto-optically active and with the presence of Pb, Ce, or Bi in said $ABO_3$ perovskite structure increases magneto-optical activity in the waveguide layer without increasing optical absorption at temperature.

11. The method of claim 10 further comprising forming a plurality of buffer layers formed on said substrate so as to allow epitaxial growth of said waveguide layer on said substrate.

12. The method of claim 10 further comprising forming a cladding layer coverings the top region of the waveguide layer.

13. The method of claim 12, wherein said optical cladding layer comprises materials with lower refractive index as compared to the waveguide layer.

14. The method of claim 10 further comprising forming a permanent magnet film positioned on the layer cladding layer and provides a magnetization along the waveguide layer.

15. The method of claim 10, wherein said waveguide layer comprises a channel waveguide.

16. The method of claim 10, wherein said waveguide layer comprises a ridge waveguide.

17. The method of claim 14, wherein said permanent magnet film provides a magnetic field where Faraday rotation is achieved when light is propagating in said magneto-optical structure.

18. The method of claim 10, wherein said waveguide layer comprises a Mach-Zehnder interferometer.

* * * * *

UNITED STATES PATENT AND TRADEMARK OFFICE
CERTIFICATE OF CORRECTION

| | | |
|---|---|---|
| PATENT NO. | : 7,995,893 B2 | Page 1 of 1 |
| APPLICATION NO. | : 12/262739 | |
| DATED | : August 9, 2011 | |
| INVENTOR(S) | : Lei Bi et al. | |

It is certified that error appears in the above-identified patent and that said Letters Patent is hereby corrected as shown below:

IN THE SPECIFICATIONS:

In Column 1, Line 3, insert the following:

--SPONSORSHIP INFORMATION
The invention was made with government support under Grant No. DMR0604430 awarded by the National Science Foundation and under Grant No. FA8712-05-C-0002 awarded by the U.S. Air Force. The government has certain rights in this invention.--

Signed and Sealed this
Third Day of January, 2012

David J. Kappos
*Director of the United States Patent and Trademark Office*